(12) United States Patent
Carullo et al.

(10) Patent No.: US 8,099,446 B2
(45) Date of Patent: Jan. 17, 2012

(54) DIGITAL CONTENT SEARCHING TOOL

(75) Inventors: Vittorio Carullo, Rome (IT); Roberto Guarda, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 12/263,607

(22) Filed: Nov. 3, 2008

(65) Prior Publication Data

US 2009/0157661 A1 Jun. 18, 2009

(30) Foreign Application Priority Data

Dec. 12, 2007 (EP) .................................... 07123059

(51) Int. Cl.
*G06F 12/00* (2006.01)
*G06F 15/16* (2006.01)
*G06F 7/00* (2006.01)
(52) U.S. Cl. ....................................... 707/899; 707/707
(58) Field of Classification Search .................. 707/707; 382/152; 709/231
See application file for complete search history.

(56) References Cited

U.S. PATENT DOCUMENTS

| | | | |
|---|---|---|---|
| 5,579,471 | A | 11/1996 | Barber et al. |
| 7,340,450 | B2 | 3/2008 | Sugahara et al. |
| 7,412,534 | B2 * | 8/2008 | Tsang et al. ................... 709/231 |
| 2004/0135815 | A1 | 7/2004 | Browne et al. |
| 2006/0206459 | A1 | 9/2006 | MacLaurin |
| 2007/0067290 | A1 | 3/2007 | Makela |
| 2007/0110338 | A1 * | 5/2007 | Snavely et al. ............... 382/305 |
| 2008/0247635 | A1 * | 10/2008 | Davis et al. ................... 382/152 |
| 2008/0247636 | A1 * | 10/2008 | Davis et al. ................... 382/152 |

FOREIGN PATENT DOCUMENTS

WO WO0190949 A1 11/2001

OTHER PUBLICATIONS

Abowd, G.D. et al., "The Family Video Archive: An Annotation and Browsing Environment for Home Movies," Proc. 5th ACM SIGMM International Workshop on Multimedia Information Retrieval, Nov. 7, 2003, pp. 1-8, Berkeley, CA, USA.
Bergman, Lawrence D., Castelli, Vittorio, and Li, Chung-Sheng, "Progressive Content-Based Retrieval from Satellite Image Archives," Networked Data Systems Department, IBM T.J. Watson Research Center, D-Lib Magazine, Oct. 1997, ISSN 1082-9873.

* cited by examiner

*Primary Examiner* — Susan Chen
(74) *Attorney, Agent, or Firm* — Nelson and Nelson; Daniel P. Nelson; Alexis V. Nelson

(57) ABSTRACT

Embodiments of the invention may include a method for searching digital content in a data processing system. The method may include providing a set of sample digital resources. Each sample digital resource may be associated with metadata describing its content, including fields having associated metadata values. A user may select at least one sample digital resource from the set. One or more metadata values of the sample digital resource may be displayed to the user. The user may then select at least a portion of the metadata values. A digital resource having one or more metadata values substantially matching the selected metadata value of the sample digital resource may then be retrieved.

13 Claims, 7 Drawing Sheets

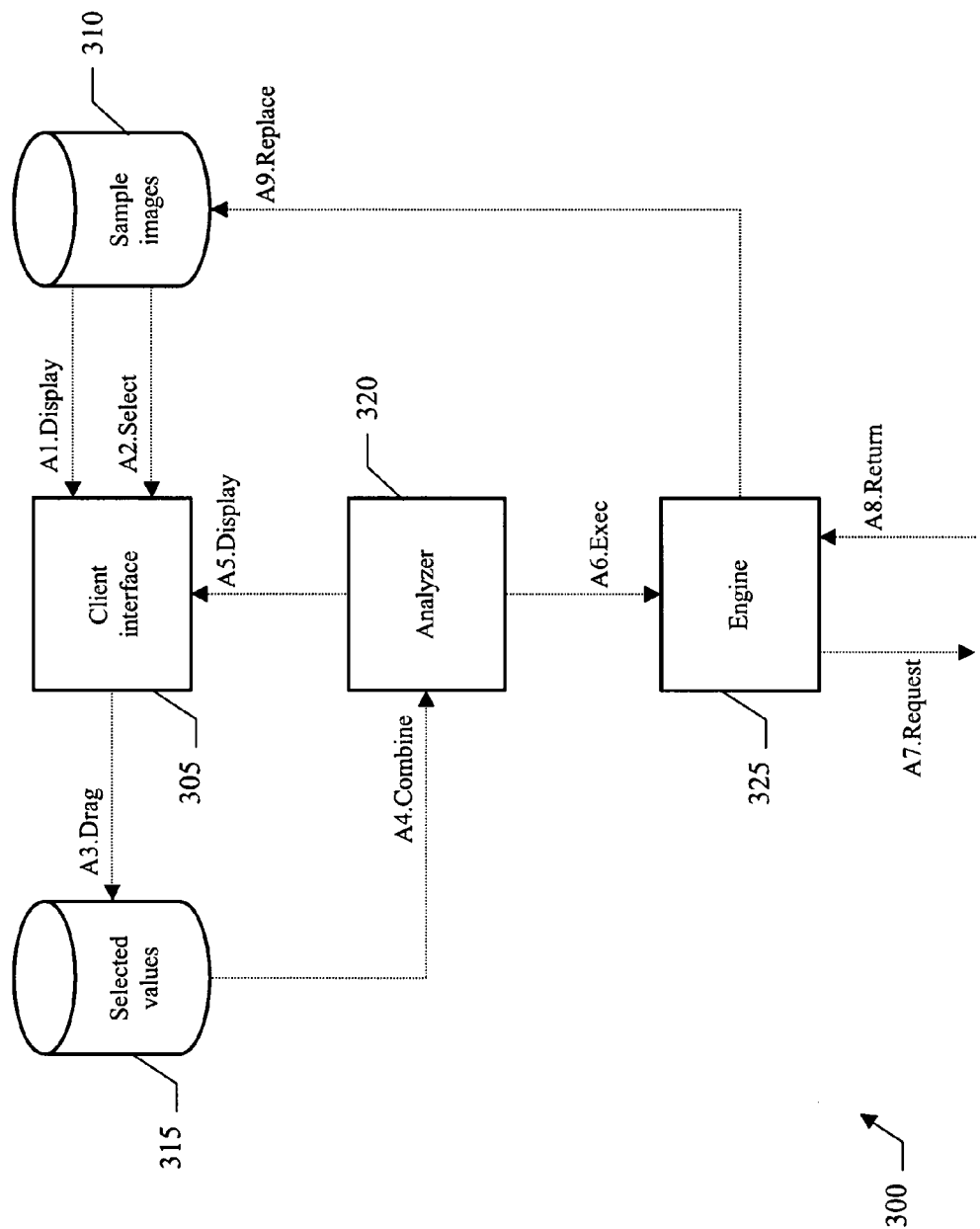

DIGITAL CONTENT SEARCHING TOOL

BACKGROUND OF THE INVENTION

Description of the Related Art

Recent years have seen a proliferation of the use of digital resources, such as digital images. This is mainly due to the widespread diffusion of corresponding acquisition devices, such as stand-alone still cameras or those embedded in mobile telephones, scanners, and the like. This trend is further fostered by the increasing availability of high-capacity storage devices, powerful data processing systems, and large bandwidth networks which facilitate the storage, processing, and exchange of the digital images.

Content management applications have been developed to help a user manage digital images. One of the most critical functions of content management applications is searching capability, which allows access to specific digital images of interest to perform desired operations thereon.

Generally, the search is based on the content of metadata, which describes each digital image associated therewith. For this purpose, most known content management applications provide a text-based interface that enables the user to enter a desired filtering condition (e.g., in the form of keywords, possibly combined with logic operators). This filtering condition may then be used to generate a query. Execution of the query may retrieve all the digital images with metadata matching the filtering condition.

SUMMARY OF THE INVENTION

Embodiments of the invention have been developed to provide a tool to facilitate searching digital resources.

Some embodiments of the invention may include a method for searching digital content in a data processing system. The method may include providing a set of sample digital resources. Each sample digital resource may be associated with metadata describing its content, including fields having associated metadata values. A user may select at least one sample digital resource from the set. One or more metadata values of the sample digital resource may be displayed to the user. The user may then select at least a portion of the metadata values. A digital resource having one or more metadata values substantially matching the selected metadata value of the sample digital resource may then be retrieved.

A corresponding system and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 3 is a collaboration diagram representing the roles of different software components that may be used to implement embodiments of the invention.

DETAILED DESCRIPTION OF THE INVENTION

It will be readily understood that the components of embodiments of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the disclosure, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that embodiments of the invention can be practiced without one or more of the specific details, or with other methods, components, etc. In other instances, well-known structures, or operations are not shown or described in detail to avoid obscuring aspects of the disclosure.

The illustrated embodiments of the invention will be best understood by reference to the drawings, wherein like parts are designated by like numerals throughout. The following description is intended only by way of example, and simply illustrates certain selected embodiments of the invention that are consistent with the disclosure as claimed herein.

Figure 1:
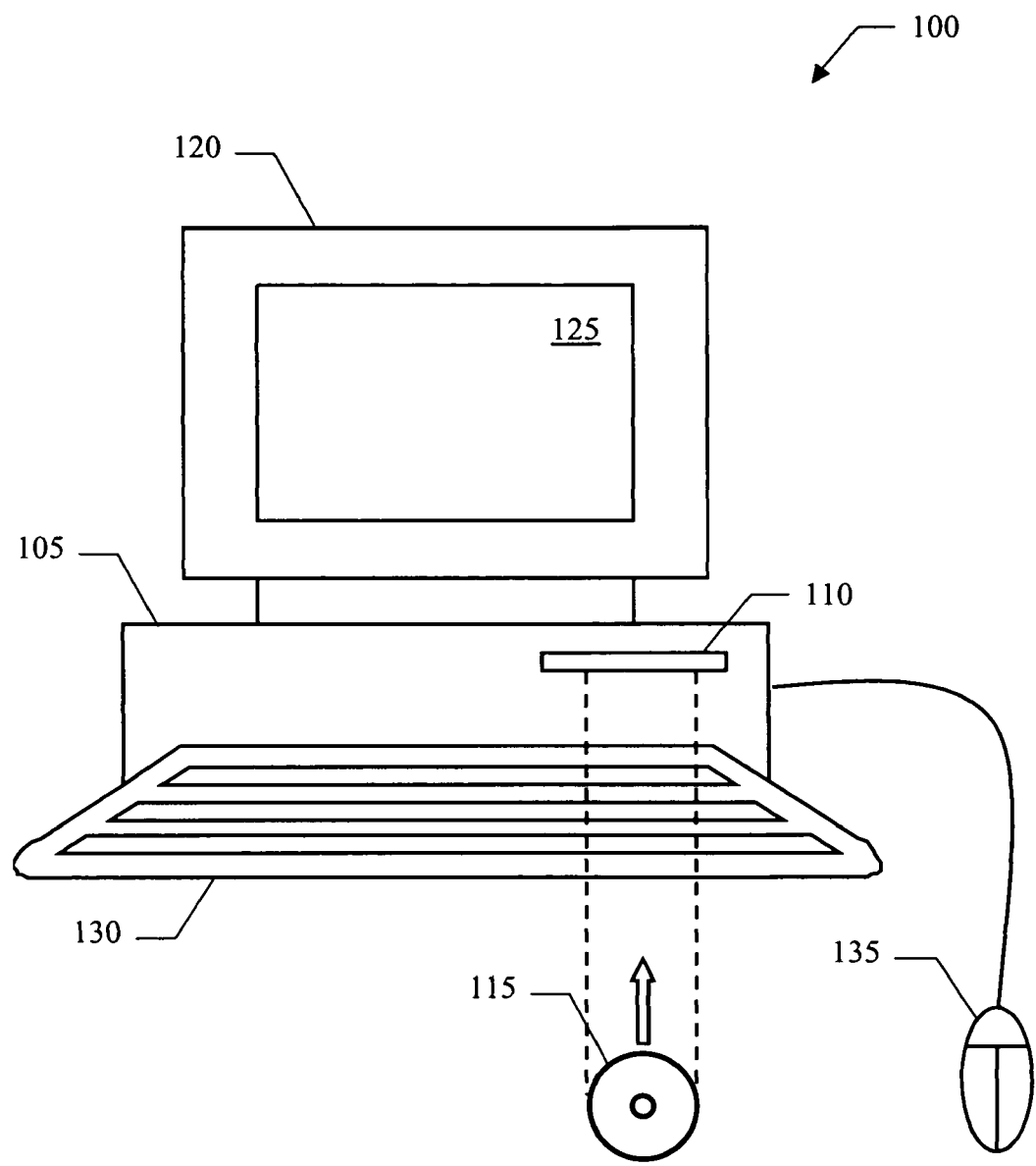
FIG. 1 is a pictorial representation of a data processing system in which embodiments of the invention may be applied.

With reference now to FIG. 1, a computer 100 such as a personal computer ("PC") is illustrated. The computer 100 may include a central unit 105 which houses the electronic circuits controlling its operation. Typically, these electronic circuits may include a microprocessor, a working memory, drives for input/output units, a network adapter, and the like. The computer 100 may also be provided with a hard disk, and a drive 110 for reading CD-ROMs and/or DVD-ROMs 115. A monitor 120 may be used to display images on a screen 125. Operation of the computer 100 may be controlled by means of a keyboard 130 and a mouse 135, which may be connected to the central unit 105 in the conventional manner.

Figure 2A:
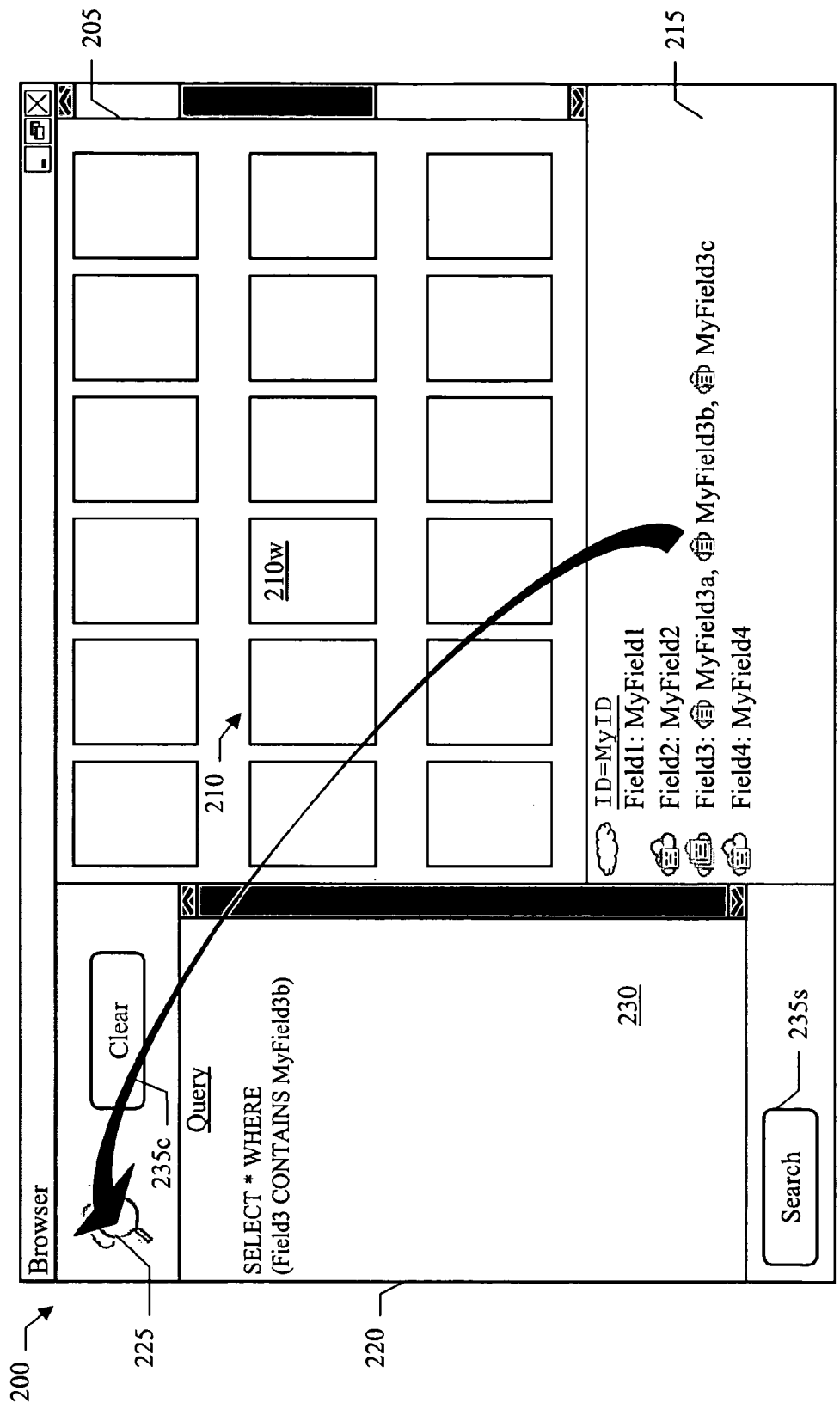
FIGS. 2A-2E show different examples of application of the solution according to embodiments of the invention.

Referring now to FIG. 2A, the above-described computer 100 may be used to manage (i.e., acquire, store, and retrieve) digital content by, for example, interacting with a remote server through a network connection. Digital content or resources may consist of an object, such as a file, that can be accessed individually. One example of a digital resource may include a digital image formed by a bitmap of pixel values.

Each image may be associated with metadata describing it. The metadata may be stored in the same file as the image, or may be stored in a separate database and linked to the image. Metadata of all the available images may be loaded into a common database to facilitate their search.

Metadata commonly includes a set of key/value pairs. Each key may represent a metadata type defining a field. The field may admit a single value or multiple values, referred to as tags. For example, single-value fields may be used to provide the title, author, or date, while multi-value fields may be used to provide attributes in the form of keywords, such as color, person, animal, object, place, and the like.

To access specific images of interest, users generally must search among all available images. Embodiments of the present invention, on the other hand, may provide a set of one or more images to be used as samples. In one embodiment, for example, the sample images may include images resulting from a previous search. The user may select one or more values, or a portion thereof, of the sample images (e.g., by manipulating corresponding graphical objects). These values may define the characteristics of the desired images. The images of interest may then be retrieved according to the selected values (e.g., by generating and executing a corresponding query).

Embodiments of the present invention may be intuitive to allow performing complex searches in a simple way. Such techniques may also be very flexible. For example, in some embodiments, a user may search for images similar to the sample images in only one or more specific aspects, or combination thereof.

Embodiments of the invention may be generally applicable such that images with a complex metadata structure may be searched, even when each field may include long values or multiple values. For example, a free-text description may require long values, while attribute descriptions may require multiple values that often reach hundreds of units.

Searching digital content as provided herein may be very fast, since the values of the fields of interest may be selected on the fly. This advantage of embodiments of the invention may be particularly evident when the search is based on multiple values of the fields, since all of the values can be directly selected at the same time.

In sum, embodiments of the invention provide a new navigation paradigm based on content-driven dynamic links among digital images. Indeed, embodiments of the invention may enable a user to move through all images by refining filtering criteria during the search. This may enable dynamic discovery of relationships between images, so as to follow dynamic paths based on the actual needs at the moment.

In an embodiment of the invention, as shown in the figure, the computer 100 may be provided with a Graphical User Interface ("GUI") that configures the screen of the monitor like a desktop. Particularly, a window may define a browser 200 for searching the desired images and navigating through them.

The browser 200 may include a frame that may be used as a workpad 205. The workpad 205 may list sample images 210 that have been retrieved by a previous search. In some embodiments, the list may be scrollable if additional space is needed. Generally, each sample image 210 may be represented by a thumbnail, thereby enabling a user to preview and identify the image 210. The user may select one of the sample images 210 as a working sample image 210w (highlighted in the figure) by clicking over it with the mouse, for example.

The metadata of the working sample image 210w, or at least the values of its most relevant fields, may be displayed in another frame defining a viewer 215. Particularly, for each field, the viewer 215 may include its key (i.e., the name of the metadata type) and its value(s).

As shown in the figure, the metadata of the working sample image 210w may include a field "ID" for its unique identifier (value "MyID"). As shown, a single-value field "Field1" may include a value "MyField1," while another single-value field "Field2" may include a value "MyField2." Similarly, a multi-value field "Field3" may include three values "MyField3a," "MyField3b," and "MyField3c," and a last single-value field "Field4" may include a value "MyField4" The field "Field1" may specify, for example, an author of the working sample image 210w, such as "MyField1=Smith." The field "Field2" may specify its year (such as "MyField2=2007"), the field "Field3" may specify different properties by means of keywords (such as "MyField3=Italy, Sunset, Spring" for the representation of a sunset at spring in Italy), and the field "Field4" may specify an owner of the corresponding copyright (such as "MyField4=IBM Corporation").

One or more fields may be used in the search. These fields, referred to as draggable fields, may be user-configurable. Each draggable field may be associated with a graphical object for its selection, as described in more detail below.

In one embodiment, for example, a cloud with a single stylized page may be displayed on the left of each draggable single-value field (i.e., the fields "Field2" and "Field4"), whereas a similar cloud with multiple stylized pages may be displayed on the left of each draggable multi-value field (i.e., the field "Field3"). For each draggable multi-value field, a smaller cloud with a stylized page may be displayed on the left of each value thereof (i.e., "MyField3a," "MyField3b," and "MyField3c"). A simple cloud may also be provided at the left of the field for the identifier of the working sample image 210w (i.e., the field "ID").

In some embodiments, the browser 200 may include another frame that may be used as an explorer 220. The explorer 220 may show a selection widget 225, depicted as a magnifier icon in the present example), which may be used to select the values of the fields used to perform a search of available images. The explorer 220 may be provided with a renderer 230 to display a query corresponding to the search in progress. A clear button 235c may be used to cancel the search by removing all the selected values of the selected fields, while a button 235s may be used to submit the query for execution.

To perform a new search, the user may select one or more clouds in the viewer 215 representing the items of interest. Particularly, the user may select a single cloud by clicking over it with the mouse. The user may select additional clouds at the same time by keeping a CTRL key pressed, for example. The user may then drag the selected cloud(s) towards the selection widget 225 by keeping a left button of the mouse pressed, for example, and drop them over it by releasing the button. In response, a query corresponding to the selected clouds may be automatically generated, as described in more detail below, and displayed in the renderer 230. The operation may be repeated to add further clouds to the selection widget 225.

In selected embodiments, it may be possible to select another sample image 210 in the workpad 205 as a new working sample image. The above-described process may then be repeated. Once the desired query has been obtained, the user may execute the search by clicking on the search button 235s with the mouse, for example. Execution of the query may return a new list of images (if any), which may be displayed in the workpad 205, thereby defining a new set of sample images 210. The search may be refined by selecting one or more values of the fields of the new sample images 210 to navigate through all available images until the desired result is obtained.

In another embodiment, the user may select the cloud for a value of a multi-value field. In this case, a query may be generated having a filtering condition specifying that the selected field contains the selected value. As shown in the figure, the user may select the cloud for the value "MyField3b" of the field "Field3." In some embodiments, the user may make this selection by dragging the cloud towards the selection widget 225, as indicated by the arrow. The query "SELECT*WHERE(Field3 CONTAINS MyField3b)" may then be generated and displayed in the renderer 230.

For example, all images with a sunset ("Field3=Sunset") may be retrieved by selecting a corresponding value in a sample image relating to the same subject. Likewise, the cloud for a single-value field may be dragged to the selection widget 225 to select its value, with the filtering condition specifying that the selected field is equal to the selected value. Searches relating to any individual value, even of multi-value fields, may thus be performed both simply and immediately.

Figure 2B:
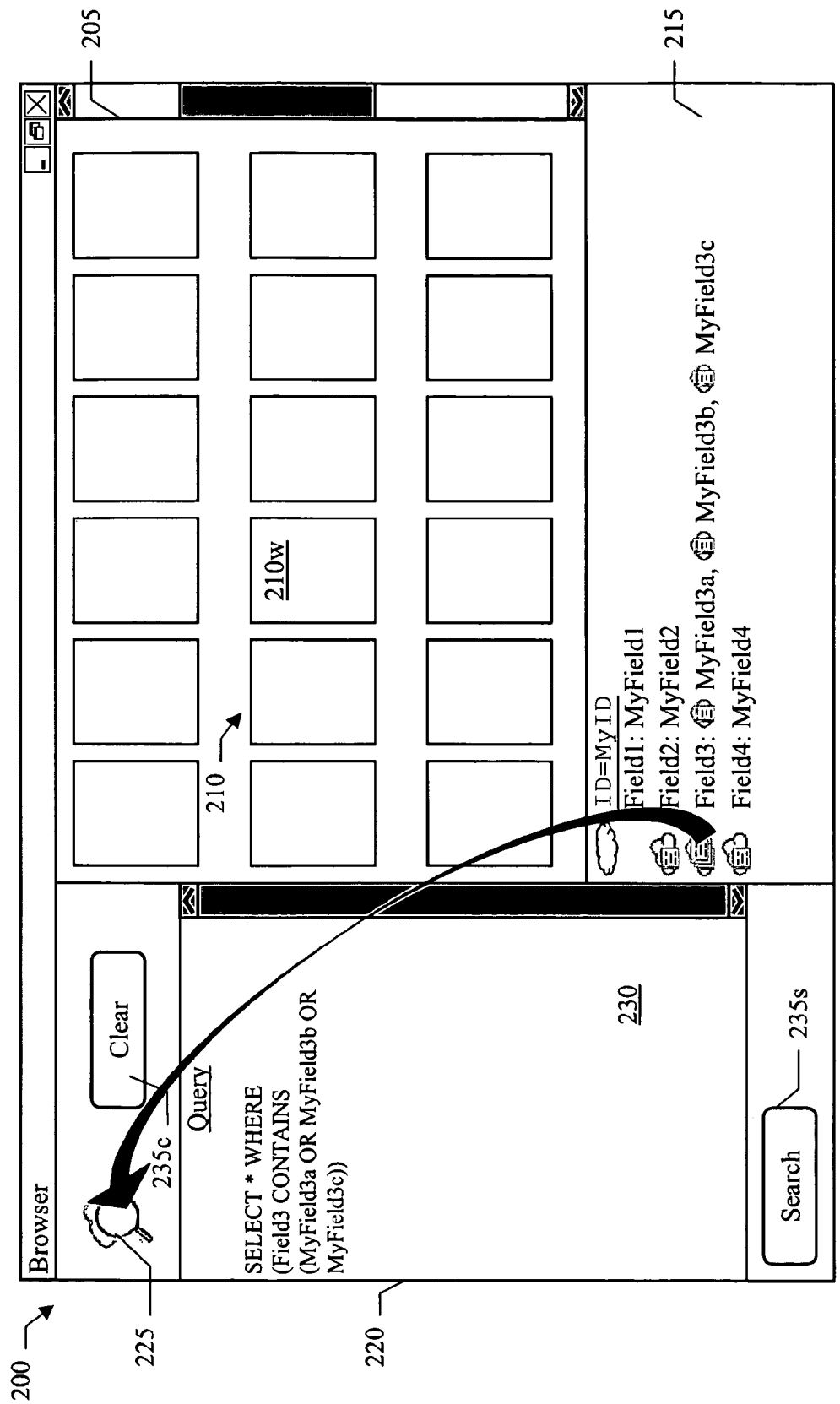

Referring now to FIG. 2B, in another embodiment, a user may select the cloud for a multi-value field. In some embodiments, all values of this field may be selected automatically. A corresponding filtering condition may be added to the query, by combining the selected values of the selected field in logic OR.

As shown in the figure, the user may select the cloud for the field "Field3," including values "MyField3a," "MyField3b," and "MyField3c." The query "SELECT*WHERE(Field3 CONTAINS (MyField3a OR MyField3b OR MyField3c))" may then be generated and displayed in the renderer 230. For example, all images relating to Italy ("Field3=Italy"), or to sunsets ("Field3=Sunset"), or to spring ("Field3=Spring"), may be retrieved by selecting a corresponding field with these values in a sample image relating to the same subject. This feature enables selection of all values of multi-value fields in a single operation (i.e., without having to select them individually). Regardless of whether the values of the multi-value fields are selected together or individually, a search may be directed individually to the values of any desired multi-value fields.

Figure 2C:
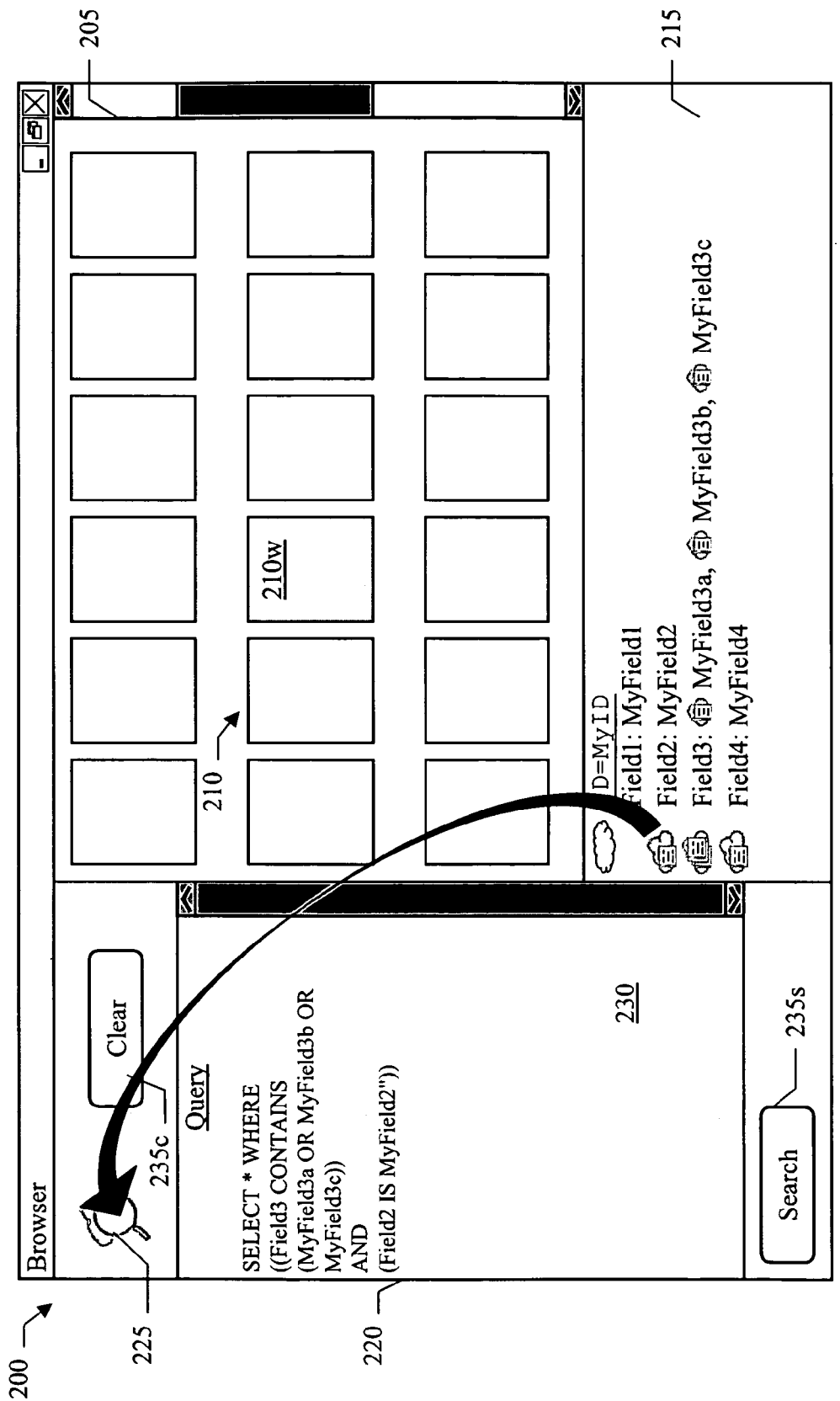

With reference now to FIG. 2C, the user may refine the search by selecting a cloud for another field. As previously discussed, individual values or all values of a particular field may be selected for this purpose. A filtering condition may be added to the query by combining it with the preceding query in logic AND.

As shown, the user may select the cloud for the single-value field "Field2" (value "MyField2"). The query in the renderer 230 may be "SELECT*WHERE((Field3 CONTAINS (MyField3a OR MyField3b OR MyField3c)) AND (Field2 IS MyField2)). This operation may restrict the result of the search (e.g., the images relating to Italy or sunsets or spring in the previous example) to only images taken in 2007 ("MyField2=2007"). As a result, very complex searches may be performed even by persons with no technical expertise.

Figure 2D:
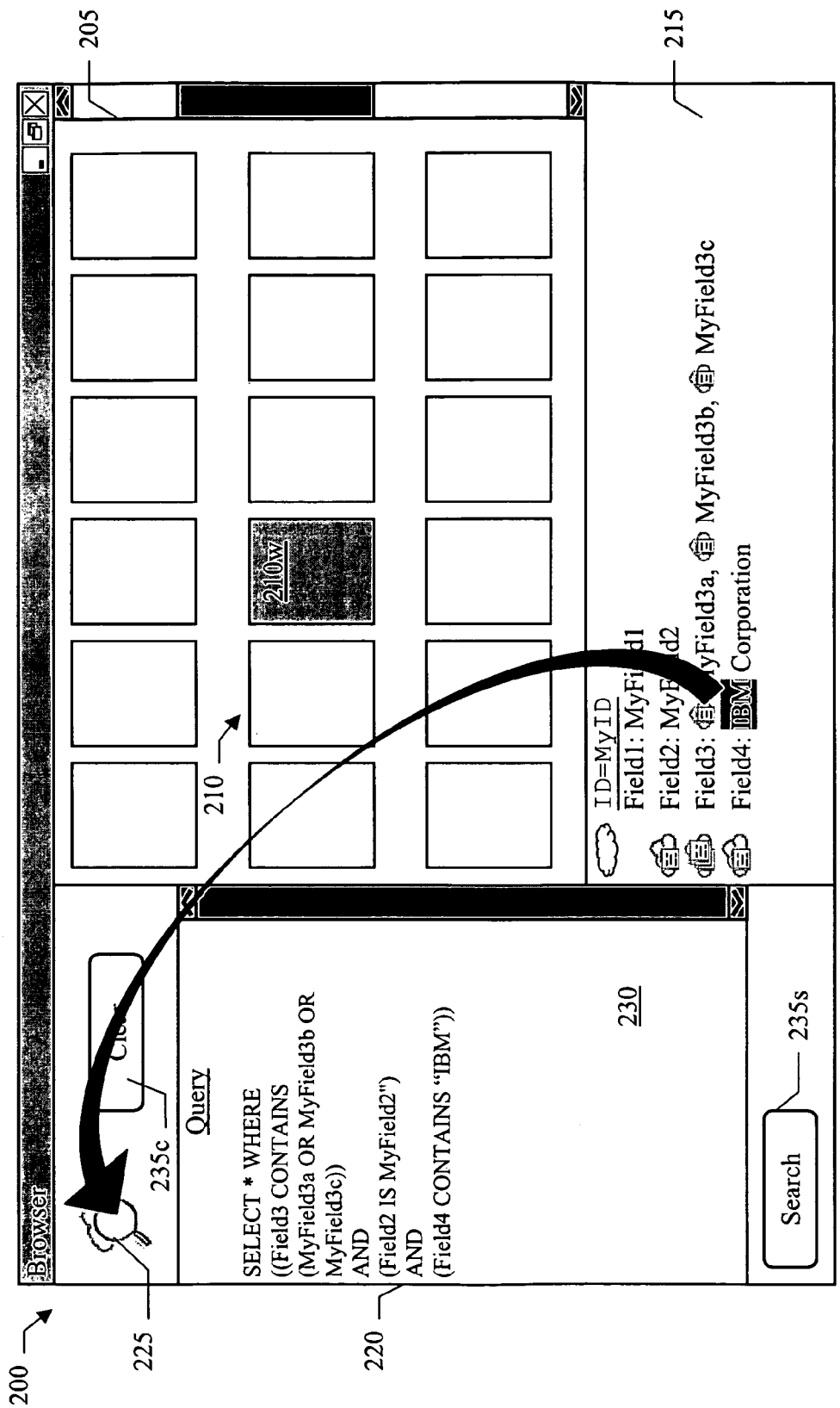

Referring now to FIG. 2D, the user may select only a portion of a value for a single-value or a multi-value field. For example, the portion of interest in the field may be selected with the mouse, and then dragged towards the selection widget 225. A filtering condition may be added to the query, specifying that the selected field contains the selected portion of the value.

As shown, the user may select the portion "IBM" for the single-value field "Field4" (value "MyField4=IBM Corporation". The query in the renderer 230 may then become "SELECT*WHERE((Field3 CONTAINS (MyField3a OR MyField3b OR MyField3c)) AND (Field2 IS MyField2") AND (Field4 CONTAINS "IBM")). This may restrict the result of the previous search (i.e., the images relating to Italy or sunsets or spring taken in 2007) to only those images owned by IBM. This feature may be very useful when specific expressions are to be searched in very long values, such as for free-text descriptions.

Figure 2E:
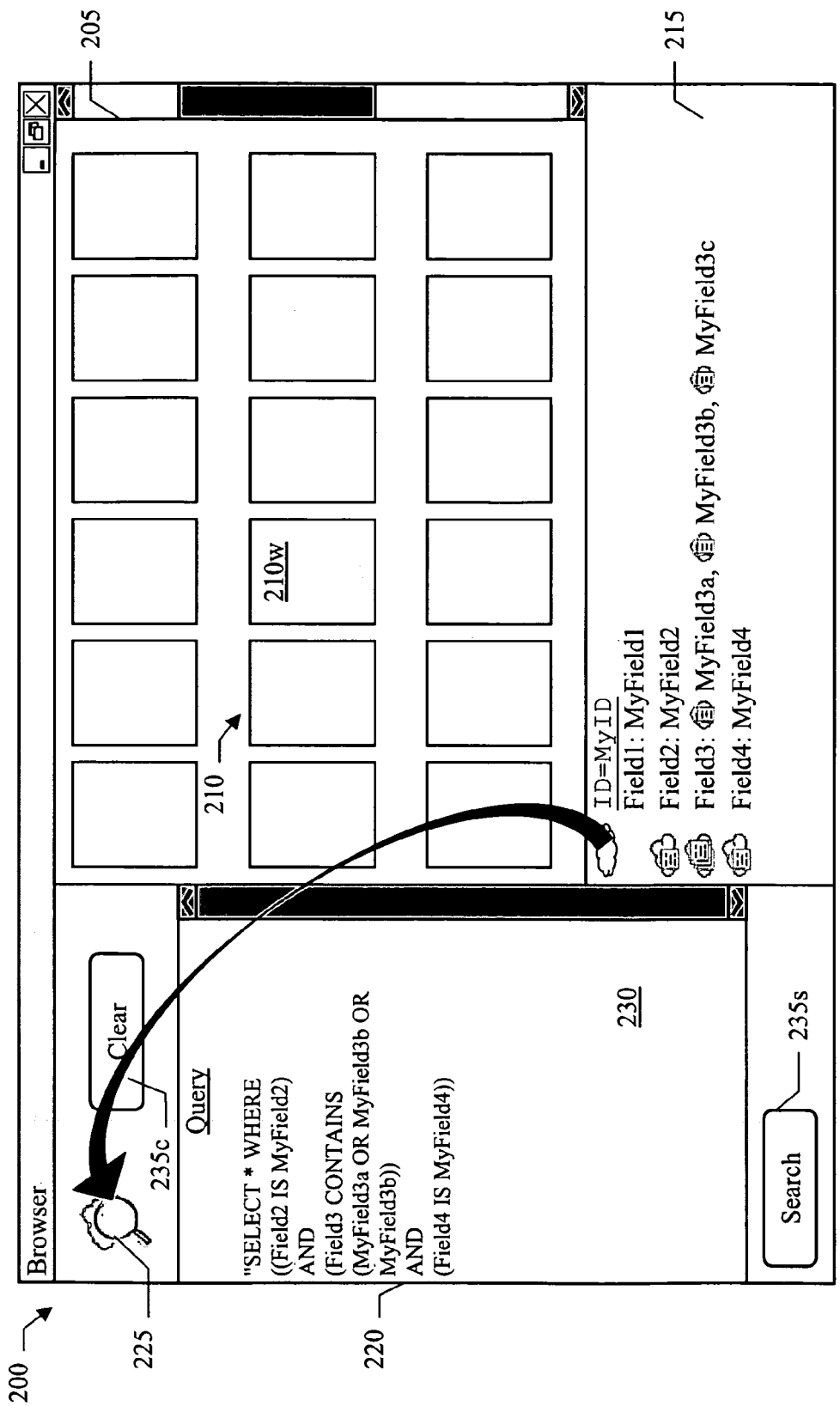

Referring now to FIG. 2E, the user may further select the cloud for the whole working sample image 210$w$. In some embodiments, all values of the draggable fields of the working sample image 210$w$ may be automatically selected. A query may then be generated with a corresponding filtering condition. Particularly, the filtering conditions for each multi-value field may be combined in logic OR, and the filtering conditions for the various single-value or multi-value fields may be combined in logic AND.

As shown, this process may be equivalent to selecting the cloud for the field "Field2" (value "MyField2"), the cloud for the field "Field3" (values "MyField3a," "MyField3b," and "MyField3c"), and the cloud for the field "Field4" (value "MyField4"). The query "SELECT*WHERE((Field2 IS MyField2) AND (Field3 CONTAINS (MyField3a OR MyField3b OR MyField3b)) AND (Field4 IS MyField4))" may then be generated and displayed in the renderer 230. This additional feature may provide a shortcut that enables searches to be performed with a single operation.

Referring now to FIG. 3, various software components 300 may be used to implement embodiments of the invention. Information, such as programs and data, may be stored on a computer 100 and loaded at least partially into its working memory when the programs are running, together with an operating system and other application programs not shown in the figure. The programs may be initially installed onto the hard disk from DVD-ROM, for example. The figure depicts the static structure of the system by means of the corresponding components, as well as its dynamic behavior, by means of a series of exchanged messages. Each message may represent a corresponding action, denoted with sequence numbers preceded by the symbol "A."

In detail, a client interface 305 may implement a client side of a content management application, such as the above-mentioned NICA, which server side offers a corresponding service over a network to any client accessing it. A cache 310 may temporarily store the current sample images. The client interface 305 may access the cache 310 to display a thumbnail of the sample images in the workpad of the browser (action "A1.Display").

The user may select the working sample image among those displayed in the workpad by, for example, clicking over it with the mouse. In response, the client interface 305 may retrieve the metadata of the working sample image from the cache 310, and display it in the viewer (action "A2.Select"). The user may then drag any desired cloud for one or more values, fields, or the whole working sample image, or any desired portion of the same, towards the selection widget of the explorer. The selected values of the selected fields may then be added to a table 315 (action "A3.Drag").

An analyzer 320 may access the table 315. When the content of the table 315 changes, the analyzer 320 may generate a query with a filtering condition corresponding to the selected values. Specifically, the filtering conditions for each multi-value field may be combined in logic OR, and the filtering conditions for the various fields may be combined in logic AND (action "A4.Combine"). The query may then be displayed in the renderer of the explorer ("A5.Display").

Upon selection of the search button, the analyzer 320 may submit the query for execution to an engine 325 (action "A6.Exec"). The engine 325 may post a corresponding request to a server (not shown) of the content management application (action "A7.Request"). The server may then process the request and return a corresponding result to the engine 325 (action "A8.Return"). The result may include, for example, a list of the images matching the desired filtering criteria. The engine 325 may then replace the content of the cache with the images so obtained, so as to define a new set of sample images (action "A9.Replace").

Naturally, in order to satisfy local and specific requirements, a person skilled in the art may apply to the embodiments described above many logical and/or physical modifications and alterations. More specifically, although the present invention has been described with a certain degree of particularity with reference to the Figures, it should be understood that various omissions, substitutions and changes in the form and details, as well as other embodiments, are possible.

Particularly, the proposed embodiments may be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Embodiments of the present invention lend themselves to be implemented with an equivalent method by using similar steps, removing some non-essential steps, or adding further optional steps. Further, the steps may be performed in a different order, concurrently, or in an interleaved way, in whole or in part.

Although reference has been made to digital images in the preceding description, this is not to be interpreted as limiting in any way. Indeed, embodiments of the invention may also be applied to search video clips, audio files, standard files, or more generally, any other digital contents. Likewise, metadata may be provided in any equivalent format, and may be used to store any other information relating to the corresponding digital content (such as its size, gender, and the like).

It is also possible to provide the sample images in a different way. In one embodiment, for example, sample images may be provided by saving a link to commonly accessed sample images. A simplified embodiment may only support the selection of a single cloud at a time. In other embodiments, it may be possible to have the metadata of multiple working sample images displayed together in the viewer to allow selection of clouds relating to different sample images at the same time. Naturally, the images corresponding to the selected values of the selected fields may be retrieved with any equivalent technique, such as by accessing a local database, by identifying them in a catalogue, and the like.

Nothing prevents implementing embodiments of the invention with a different user interface. For example, the items available to be selected may be represented with equivalent icons, or they may be selected in another way, such as by simply double-clicking over them without utilizing a selection widget. In other embodiments, the selected clouds may be stacked in a tower to enable one or more selected clouds to be removed, the query may not be displayed, or the like.

Each sample image may have any number of draggable fields. The cloud associated with each draggable multi-value field, provided to enable selection of all associated values automatically, may not be strictly necessary, as the same result may be achieved by selecting them individually. Further, selection of all the values of all draggable fields of the working sample image may be achieved directly by dragging the corresponding thumbnail towards the selection widget. This additional feature may be omitted, however, as the user may directly select the desired values.

Selection of portions of values may be enabled at the level of words or expressions. Selection of entire values is also contemplated.

A more sophisticated embodiment of the invention may provide a selection widget for defining complex logical relations among the selected values. For example, in a tower created for the selection of the clouds, it may be possible to combine the clouds in the tower in logic AND, to group more clouds in the same position to combine them in logic OR, or more generally to support any other logic operator (such as NOT, XOR, NAND, and the like).

Nothing prevents using the result of each search in any other way. For example, it may be possible to have one dedicated frame for the sample images and one dedicated frame for the result of the search. In such a case, sample images may be changed directly by the user by adding one or more of the retrieved images, for example.

Naturally, the above-described values of the fields in the metadata are merely illustrative. Indeed, embodiments of the invention may be applied to any type of values, including single values, multiple values, free format values, values with predefined constraints, and the like.

Embodiments of the invention may be implemented as a stand-alone module, as a plug-in for the content management application, or even directly embedded in the content management application. It would be readily apparent that it is also possible to deploy the same solution as a service that is accessed through a network (such as in the Internet). Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by any data processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware.

The proposed method may also be carried out on a system having a different architecture or including equivalent units (for example, based on a local network). However, its implementation on a stand-alone computer is not excluded. Each computer may have another structure or may include similar elements (such as cache memories temporarily storing the programs or parts thereof); in any case, it is possible to replace the computer with any code execution entity (such as a PDA, a mobile phone, and the like), or with a combination thereof (such as a multi-tier architecture, a grid computing infrastructure, and the like).

The invention claimed is:

1. A computer-implemented method for searching digital content in a data processing system, the computer-implemented method comprising:
 displaying, by a computer, a set of sample digital resources, each sample digital resource being associated with metadata describing its content, the metadata including metadata fields having associated metadata values;

enabling, by the computer, a user to select a sample digital resource from the set;

displaying, by the computer, at least one metadata value of the selected sample digital resource;

enabling, by the computer, the user to select the at least one metadata value;

automatically generating, by the computer, in response to selecting the at least one metadata value, a query for retrieving a digital resource having at least one metadata value substantially matching the selected at least one metadata value of the sample digital resource; and retrieving, by the computer, the digital resource in accordance with the query.

2. The computer-implemented method of claim 1, wherein enabling the user to select the at least one metadata value further comprises:

displaying to the user a graphical representation of the at least one metadata value of the sample digital resource; and enabling the user to drag the graphical representation to a selection area to select the at least one metadata value.

3. The computer-implemented method of claim 1, wherein enabling the user to select the at least one metadata value further comprises:

displaying to the user a graphical representation of each of the metadata fields of the sample digital resource; and enabling the user to drag the graphical representation to a selection area to select all metadata values associated with the metadata fields.

4. The computer-implemented method of claim 2, wherein enabling the user to select the at least one metadata value further comprises:

displaying a graphical representation of the sample digital resource, and enabling the user to drag the graphical representation to a selection area to select all the metadata values associated with the selected sample digital resource.

5. The computer-implemented method of claim 2, wherein enabling the user to select the at least one metadata value further comprises enabling the user to drag the at least one metadata value to the selection area to select the at least one metadata value.

6. The computer-implemented method of claim 1, wherein enabling the user to select the at least one metadata value further comprises enabling the user to select a plurality of metadata values of the selected sample digital resource.

7. The computer-implemented method of claim 6, wherein the query comprises a filtering condition based on the plurality of metadata values in logic OR.

8. The computer-implemented method of claim 1, wherein enabling the user to select the at least one metadata value further comprises enabling the user to select at least one metadata value of a plurality of metadata fields of the selected sample digital resource.

9. The computer-implemented method of claim 8, wherein the query comprises a filtering condition based on the plurality of metadata fields in logic AND.

10. The computer-implemented method of claim 1, further comprising designating the retrieved digital resource as a sample digital resource provided in a next set of sample digital resources.

11. The computer-implemented method of claim 1, wherein at least one of the metadata fields is associated with a plurality of metadata values.

12. A computer program product for searching digital content in a data processing system, the computer program product comprising:

a non-transitory computer-readable storage medium having computer-usable program code stored thereon, the computer-usable program code comprising:

computer-usable program code for displaying a set of sample digital resources, each sample digital resource being associated with metadata describing its content, the metadata including fields having associated metadata values;

computer-usable program code for enabling a user to select a sample digital resource from the set;

computer-usable program code for displaying to the user at least one metadata value of the sample digital resource;

computer-usable program code for enabling the user to select the at least one metadata value;

computer-usable program code for automatically generating, in response to selecting the at least one metadata value, a query for retrieving a digital resource having at least one metadata value substantially matching the at least one metadata value of the sample digital resource; and computer-usable program code for retrieving the digital resource in accordance with the query.

13. A system for searching digital content in a data processing system, the system comprising:

a workpad to display a set of sample digital resources and enable a user to select a sample digital resource from the set, each sample digital resource being associated with metadata describing its content, the metadata including fields having associated metadata values;

a viewer to display to the user at least one metadata value of the sample digital resource and enable the user to select the at least one metadata value; and an explorer to automatically generate, in response to selection of the at least one metadata value, a query for retrieving a digital least one metadata value substantially matching the at least one metadata value of the sample digital resource, and retrieve the digital resource in accordance with the query.

\* \* \* \* \*